United States Patent [19]

Pearson

[11] 4,427,745

[45] * Jan. 24, 1984

[54] NOVEL FIRE RETARDANT COMPOSITIONS AND METHODS

[76] Inventor: Glenn A. Pearson, 3709 S. George Mason Dr., Falls Church, Va. 22041

[*] Notice: The portion of the term of this patent subsequent to Jan. 25, 2000 has been disclaimed.

[21] Appl. No.: 404,916

[22] Filed: Aug. 3, 1982

Related U.S. Application Data

[63] Continuation-in-part of Ser. No. 214,017, Dec. 5, 1980, Pat. No. 4,370,442.

[51] Int. Cl.³ .............................................. B32B 27/42
[52] U.S. Cl. .................... 428/524; 524/247; 524/417
[58] Field of Search ............... 524/247, 417; 428/524

[56] References Cited

U.S. PATENT DOCUMENTS

| | | | |
|---|---|---|---|
| 2,681,326 | 6/1954 | Christianson | 524/416 |
| 3,883,462 | 5/1975 | Pearson | 260/29.4 |
| 3,983,269 | 9/1976 | Pearson | 427/370 |
| 3,984,367 | 10/1976 | Pearson | 427/390 |
| 3,990,977 | 11/1976 | Pearson | 252/526 |
| 4,119,598 | 10/1978 | Pearson | 428/528 |
| 4,215,172 | 7/1980 | Pearson | 428/264 |
| 4,370,442 | 1/1983 | Pearson | 524/598 |

FOREIGN PATENT DOCUMENTS 827645  2/1960  United Kingdom ............... 524/417

OTHER PUBLICATIONS

S. N. 404915, Pearson, 1982.

*Primary Examiner*—Joseph L. Schofer
*Assistant Examiner*—N. Sarofim
*Attorney, Agent, or Firm*—Lowe, King, Price & Becker

[57] ABSTRACT

There is disclosed a resinous solution comprising the reaction product of (a) about 100-140 parts by weight of an aldehyde, (b) about 75-125 parts by weight of urea, (C) about 30-50 parts by weight of an alkanolamine, and (d) about 175-225 parts by weight of phosphoric acid, and optionally (e) melamine, and (f) a soil and stain resistant agent. The solution is a stable, clear solution having a good shelf-life and forms flexible, hard, non-burning films on substrates such as textiles.

13 Claims, No Drawings

NOVEL FIRE RETARDANT COMPOSITIONS AND METHODS

CROSS-REFERENCE TO RELATED APPLICATIONS

This application is a continuation-in-part of application Ser. No. 214,017, filed Dec. 5, 1980, now U.S. Pat. No. 4,370,442 Jan. 25, 1983.

FIELD OF THE INVENTION

The present invention relates to resinous coating systems and more particularly relates to novel urea-formaldehyde resinous systems whereby formaldehyde, urea, and alkanolamine, and phosphoric acid are sequentially reacted in selected proportions to yield a resinous composition providing unique properties and/or characteristics when employed as or in coatings, particularly coatings which are waterproof and fireproof.

BACKGROUND ART

Urea-formaldehyde resinous systems are well known in the art for use in various applications. Moreover, various modifications to such resinous systems have been described in the literature including the coreaction of the formaldehyde and urea with triethanolamine. Further, techniques have been devised to provide formaldehyde-urea resinous systems which are water soluble. However, in the prior art systems, the control of the reaction is difficult, apparently due to the high reactivity of the formaldehyde and urea leading to varying degrees of nonuniformity of the resinous system from batch to batch. To obtain water soluble resinous systems, relatively complex techniques of acidification and neutralization are necessary. These techniques again lead to nonuniform resinous systems which often provide cured products with deficiencies. Formaldehyde odor is also a problem with systems of these types.

Systems of this type are described in my prior U.S. Pat. Nos. 3,883,462; 3,983,269; 3,984,367; 3,990,977; 4,119,598 and 4,215,172. All of these prior patents describe urea-formaldehyde compositions similar to those claimed herein. The compositions and methods of the present invention are improvements over my prior patents, especially U.S. Pat. Nos. 4,119,598 and 4,215,172, and is an improvement over my prior filed pending application Ser. No. 214,017, filed Dec. 5, 1980, in the provision of resinous coating solutions having excellent fire retardant properties and other characteristics.

SUMMARY OF THE INVENTION

It is accordingly a primary object of the present invention to provide a method of producing a urea-formaldehyde resin system which has excellent fire-retardant properties and forms hard clear films.

A further object of this invention is to provide a resinous system which is compatible with various additives, permitting modification of the system to meet the requirements of diverse applications including water repellency.

It is a further object of this invention to provide a resinous system which is air or heat curable to a tough, clear, waterproof nonburning and nonstaining coating.

These and other objects of the present invention will be more readily apparent from the following detailed description.

In satisfaction of the foregoing objects and advantages there are provided by this invention a resinous composition comprising the following components:

| Component | Amount by Weight |
| --- | --- |
| Aldehyde | 100–140 |
| Urea | 75–125 |
| Alkanolamine | 30–50 |
| Phosphoric Acid | 175–225 |

The solution of the invention is especially suitable as a nonstaining, fire retardant coating or adhesive for substrates.

DESCRIPTION OF PREFERRED EMBODIMENTS

As pointed out above, the present invention is concerned with a urea-formaldehyde resinous system which has unique characteristics and which is an improvement over the resinous systems described in my prior patents and pending application. The resinous system of this invention is particularly suitable as a fire-retardant coating and adhesive for use with cellulosic and synthetic products generally and particularly for use as a coating or adhesive with paper, cardboard, wood, or any other material which is subject to burning. The composition of the invention is particularly useful as a back coating for textile products as the composition forms a clear, hard, nonburning finish to the substrate.

In its broadest aspects, the composition of this invention comprises the following:

| Component | Parts by Weight |
| --- | --- |
| Aldehyde | 100–140 |
| Urea | 75–125 |
| Alkanolamine | 30–50 |
| Phosphoric Acid | 175–225 |

The ratios given above should not deviate from the stated amounts by more than about 15% because the unique properties of the polymer will be affected and to this extent the ratios are critical. Further, the material should be mixed in the sequence set forth in the above composition, that is the aldehyde and urea are initially mixed together and the alkanolamine is then added to this mixture. Finally, the phosphoric acid is added as the final product.

While urea is the preferred reactant, it should be understood that other ureas such as thiourea, ethylene urea, dimethylol ethylene urea, or other substituted urea may be employed. The urea is preferably added as the commercial form which contains about 46% nitrogen.

As the aldehyde, one may use a simple aldehyde such as formaldehyde, acetaldehyde, paraldehyde, glyoxal, or other mono-, di, or poly-aldehydes. In addition, any substance yielding or acting as an aldehyde may be used. Formaldehyde is the preferred aldehyde as it is conveniently obtained commercially as a 37 weight percent aqueous solution.

The preferred alkanolamine will have 1 to 4 carbon atoms in the alkyl group, and the most preferred alkanolamine is triethanolamine, but others such as diethanolamine or mixtures may also be used. Triethanolamine is commercially available as a 98-99 weight percent solution.

The most preferred composition comprises 110-130 parts by weight aldehyde, 80-100 parts by weight urea, 35-45 parts by weight alkanolamine, and 185-210 parts by weight of phosphoric acid.

As will be noted from the above formulation, the amount of phosphoric acid added to the composition of the present invention ranges from about 175-225 parts by weight and more preferably about 185-210 parts by weight. The phosphoric acid is preferably employed as an 85% aqueous solution as this is a commercial available form. The amount of phosphoric acid contained in the composition of this invention is a feature which provides advantages over the compositions described and claimed in my parent application and prior issued patents. It will be noted that the amount of phosphoric acid incorporated into the composition of this invention is significantly greater than those in any of the compositions of the parent application and prior patents. Thus, it has been found unexpectedly that the resulting composition is a more effective fire-retardant and dries faster than the prior formulations in forming a clear hard, flexible finish. A particularly unexpected aspect of the present invention is that the odor of formaldehyde during application of the composition is substantially reduced over the prior formulations and once the resulting coating has dried and cured, there is no odor of formaldehyde detectable from the coating. This is completely unexpected since urea-formaldehyde resins in general often have residual formaldehyde odors associated with coatings using such resins.

Other advantageous features of the composition of the present invention are that alcohol is not required to be present as a stabilizer, the high solids content causes faster drying and curing time, and the composition is compatible with other additives to make the coating or adhesive more resistant to moisture and provide greater hardness to the finish. The resin also becomes a thermoset resin with application of elevated temperatures.

An important characteristic of the invention is the method by which the resinous composition is produced. Thus, it is necessary for the advantageous results to be achieved that a sequential addition of reactants be followed. In the preferred sequence, the aldehyde and urea are initially mixed together and while maintaining continuous agitation, the alkanolamine is added thereto. Finally, the phosphoric acid solution is added with stirring being maintained continuously until the final solution is clear. The solution is a stable solution which has a good shelf-life over an extended period of time.

When applied as a coating or adhesive the resin dries and cures at room temperature to provide a hard clear coating which will not burn. The coating is particularly suitable as a back coating for textile products as it provides fire-retardant characteristics to the resulting textile products. However, the coating can also be used as a fire-retardant coating on any type of cellulosic based products such as wood and paper as well as on synthetic resin substrates.

As indicated above, a feature of the composition of this invention is that it permits the presence of additives for tailoring of the composition for particular end uses. In that regard, it has been discovered that the addition of melamine to the solution in an amount of about 45-65 parts by weight, preferably about 50-60 parts by weight provides additional advantages over the compositions of the prior art including those of my prior patents and pending application. The melamine may be added as a solid or as a solution in water. A particularly preferred form of melamine to be used in forming the composition is as an 85% aqueous solution which is available under the trade name UFORMITE from Reichold Chemical.

The melamine is added to the composition as a fifth component and a clear stable solution is obtained. The addition of the melamine provides a resulting coating which is more flexible than the harder coating produced by the basic formulation. This coating solution containing the melamine is particularly suitable as a coating for TV back covers, the gluing of wall covers, as a binder for use in particle boards, as a coating for cellulosic products, for the impregnation of lumber to provide fire-retardant characteristics thereto, for powdering or spray drying applications, and in air filters. The melamine additive particularly provides water repellant or water resistant characteristics to the formulation.

In a further important aspect of the present invention it has been found that the addition of a soil and stain repeller may be added to the composition to provide these characteristics. A preferred group of such materials are fluoropolymer dispersions in water such as those available from DuPont under the trade name TEFLON. These components are added in an amount of about 5-10 weight percent and provide a greater dimension of moisture resistance as well as soil and stain resistance to the composition. A composition containing the TEFLON additive is particularly suitable for application to roof shingles and the like to provide a resulting shingle which is fire-retardant and water resistant and also resistant to soiling and staining. TEFLON NPA is particularly suitable.

It is also within the scope of the invention to add other additives to the compositions to affect other properties. Thus metal and ammonium salts can be added to increase the efficiency of the fire retardant characteristics and other desirable properties such as hardness and greater resistance to solvents or weathering. Additives of this type include oxides, hydroxides, sulfates, nitrates, phosphates, and chlorides of aluminum, zinc, tin, antimony, as well as ammonium salts. The metal salts are mixed with the phosphoric acid in the formulation whereas ammonium hydroxide when used is mixed with the urea-formaldehyde solution. The metal salts are reacted in an amount of about 6 to 12 moles based on the moles of phosphoric acid used. Ammonium hydroxide is used in an amount of about 15 to 20 moles based on the moles of aldehyde used. The ammonium is used as a buffer to raise the pH of the solution. In a still further embodiment, lactic acid or equivalent may be added to the solution in an amount of about 0.1 to 20 parts per 100 parts of total solution as this material improves stability, prevents cloudiness and cracking of the coating. Also, polyvinyl acetate may be added to the formulation which provides a more flexible and stable bond.

Although the aqueous resinous system of this invention can be used as such in or as coatings, moldings, adhesives, or the like, a characteristic feature of the resinous system is its compatibility with various accelerators and modifiers to permit the use of the resinous system in diverse applications. More specifically, the resinous system is compatible with other catalyzing agents, other fireproofing agents, fillers, pigments, lubricants and the like.

As indicated, when applied as a coating by coating or impregnation, the resin dries and cures at room temperature to provide a coating that is flexible, pliable, waterproof, and will not burn. It is thus useful as a coating on substrates such as textiles of all types, paper, cardboard, panel boards, wall board, sheet rock, television backboards, fiber boards, table tops, rigid or soft foam, wood, metals such as aluminum, and the like. The coatings may be used to prevent the oxidation of metals, i.e., as a rust-proofing agent, as a fire- and waterproof coating on wood, cardboard and fiberglass packing and the like. The coatings are especially beneficial for fabrics because a clear nonstaining, fire retardant, film is applied to the fabric. The fabrics which may be treated include 100% cotton and cotton blends, as with polyesters.

When applied it is preferable that the coating be applied to the underside of the textile or fabric so as to preserve the hand and feel of the fabric. It is also preferred to add about 20–30 parts, preferably about 25 parts, of a filler to the solution to provide body. Suitable fillers include flours, starches, calcium, sulfate, vinyl acetate, acrylic based latex, or the like. The preferred filler is pecan shell flour.

The coating is applied as by spraying or rolling with a kiss-roll and then drying. It is then cured, either at room temperature or by heating to about 120° to 140° C. (248°–284° F.). Curing at an elevated temperature is helpful in the removal of odors from the fabric. The coating should be applied at the rate of about 1.5 ounces per square yard. The resulting coated fabric or textile has good fire retardancy characteristics, even when subjected to standard cigarette burn tests.

When applied by impregnation, it is preferred to dilute the solution in order to retain the hand, tensile, and color of the fabric. Thus the formulation is diluted to about 15 to 25 weight percent for best results. In addition, it is preferred to add a fabric softener, such as that sold under the trade name "Downey", in the impregnation procedure.

In the preferred impregnation procedure, each 100 grams of the textile should be treated with a substantially equal amount of treating solution. The formulation used in the impregnation procedure preferably contains about 10 to 25 weight percent of the above formulation. In a most preferred aspect, each 100 grams of impregnating solution would contain about 12 to 20 grams of the above formulation, preferably about 15 grams, together with about 1.5 grams of a fabric softener, and the balance water.

The solution and textile are placed in a plastic bag to wet the sample to the drip point. It is then dried and cured as described. The resulting treated product has good fire retardancy and will also pass the cigarette burn test without afterburn or afterglow.

It is a feature of the invention that the basic formulation, preferably in dilute form, may be applied as a spray solution using conventional spray apparatus. When used as a spray solution, each 100 grams of the spray solution would contain about 12 to 20 grams, preferably about 15 grams of the above formulation, optionally with about 1.5 grams of a commercial softener, and the remainder water. There may also be added about 5% of a commercial water repellant such as DuPont's Zepel. This provides a solution which provides fire retardancy and also gives stain resistance and water repellancy to the textile or fabric.

This spray solution may be applied using any conventional spray system including aerosols. Use as a spray solution is simply to spray the solution on the fabric and allow to dry. It will then cure at room temperature to provide a flexible fire retardant coating. The spray solution thus provides a procedure by which the resinous solution of the invention may be applied to finished pieces of upholstered furniture, draperies and the like.

The following examples are presented to illustrate the invention but it is not to be considered as limited thereto. In the following examples and throughout the specification, parts are by weight unless otherwise indicated.

EXAMPLE 1

The following formulation was produced by mixing of the urea and formaldehyde, adding the triethanolamine thereto and then adding the phosphoric acid to the other three components while continuously mixing.

| Component | Parts by Weight |
| --- | --- |
| Formaldehyde | 324 (37% Aqueous Solution) |
| Urea | 90 (46% Nitrogen) |
| Triethanolamine | 40 (99% Aqueous Solution) |
| Phosphoric Acid | 230 (85% Aqueous Solution) |

The resulting solution was a clear solution with minimal formaldehyde odor. When left in the freezer the solution thickened but did not gel. When the solution was removed to room temperature, it returned to its normal clear form and thus had excellent storage characteristics.

EXAMPLE 2

In this example the same formulation as Example 1 was prepared with the addition of melamine as an 80% aqueous solution, the melamine used being sold under the trade name UFORMITE by Reichold Chemical. The resulting formulation comprised the following:

| Component | Parts by Weight |
| --- | --- |
| Formaldehyde | 324 (37% Aqueous Solution) |
| Urea | 90 (46% Nitrogen) |
| Triethanolamine | 40 (99% Aqueous Solution) |
| Phosphoric Acid | 230 (85% Aqueous Solution) |
| Melamine | 45 (85% Aqueous Solution) |

This formulation had stability equal to that of Example 1 without the addition of any stabilizer. The melamine was added to provide hardness or toughness to the film and greater resistance to water moisture. Also the addition of the melamine provides better adhesive qualities and under heat and pressure will cause the polymer to become thermoset.

Higher quantities of melamine can be used to provide improved adhesive qualities.

EXAMPLE 3

The television industry requires that all backboards for television sets by fire-retardant. These backboards are produced from pulped wood fibers which are collected on a screen in a process similar to paper making. Heat and pressure are used to form the boards which are usually about ⅜ of an inch thick and burn quite readily without a fire-retardant thereon. The standard test 94-5VS is used by the television industry to determine the fire-retardant characteristics of the treated TV backboard. In this test procecure, a Bunson burner with a flame 1¼ inches high which is 1,000 BTU rated is used. The samples tested are 12"×12" samples of television backboard which are placed at 20° angles from the vertical position. The burner and flame are placed so that the top of the blue flame touches the board sample and is held there for 60 seconds. The burner is then removed and for the test to be successful, that is for the fire-retardant to pass the test, the afterflame must extinguish itself within five seconds. An untreated board will continue to burn and propagate the flame.

In this example, a dozen 12"×12" sample boards were prepared. Six of these boards were coated with the formulation of my prior U.S. Pat. Nos. 4,215,172 and 4,119,598, this formulation being as follows:

| Component | Parts by Weight |
|---|---|
| Formaldehyde | 243 (37% Aqueous Solution) |
| Urea | 80 (46% Nitrogen) |
| Triethanolamine | 30 (99% Aqueous Solution) |
| Methyl Alcohol | 75 (98% Aqueous Solution) |
| Phosphoric Acid | 115 (85% Aqueous Solution) |

The other six samples were coated using the formulation of Example 1. Both formulations were coated at a rate of 15 grams per square foot. The boards were then dried with a hand-held hot air dryer. On drying there was a noticeable difference in drying time and odor as the formulation of the invention dried much faster than the formulation of the prior patent and had a clearer coating.

All samples were then subjected to the burn test described above. The six boards containing the formulation of this invention had an afterflame which averaged two seconds before self-extinguishing. The boards which were treated with the formulation of my prior patent failed this test as the average self-extinguishing time was seven seconds.

A further series of tests were run in which six additional boards were tested wherein the six boards were coated with the formulation of my prior patent using the rate of 20 grams per square foot. After drying the burn test was conducted in the same manner as described. This additional six board sample averaged four seconds prior to self-extinguishing. This meant that the formulation of my prior patent passed the test but a substantial greater quantity of the fire-retardant formulation was required.

EXAMPLE 4

A composition was produced which comprised the melamine-containing formulation of Example 2 to which 10 weight percent of the commercial product TEFLON NPA was added. This formulation was used to coat a pecan plywood panelboard which was 2'×1' in size. The panelboard was coated using 20 grams per square foot of the coating solution. After drying a hard clear finish was obtained. This coated board was tested on a 2' tunnel tester and a class A flame spread rating was obtained.

A portion of the panelboard was then used to test for water resistance. In this test, random drops of water were applied in a 3" diameter circle and petrie dishes placed over the drops and left for 12 hours. The drops were picked up with a paper towel and wiped dry after 12 hours. There were no identifying marks remaining to show where the water had been placed on the boards.

The invention has been described herein with reference to certain preferred embodiments. However, as obvious variations thereon will become apparent to those skilled in the art, the invention is not to be considered as limited thereto.

What is claimed is:

1. A resinous solution comprising the reaction product of (a) about 100–140 parts by weight of an aldehyde, (b) about 75–125 parts by weight of urea, (c) about 30–50 parts by weight of an alkanolamine, and (d) about 175–225 parts by weight of phosphoric acid, the solution being a stable clear solution having a good shelf-life and forming flexible hard nonburning films on substrates.

2. A resinous solution according to claim 1 wherein the solution is formed by mixing the aldehyde and urea with continuous agitation, then adding the alkanolamine, and then adding the phosphoric acid solution and continuing agitation until a clear solution is obtained.

3. A resinous solution according to claim 1 wherein the aldehyde is present in an amount of about 110–130 parts by weight, the urea is present in an amount of about 80–100 parts by weight, the alkanolamine is present in an amount of about 35–45 parts by weight and the phosphoric acid is present in an amount of about 185–210 parts by weight.

4. A composition according to claim 1 which also contains about 45–60 parts by weight of melamine.

5. A composition according to claim 4 which contains about 5–10 weight percent of a soil and stain resistant ingredient.

6. A composition according to claim 1 wherein the aldehyde is a 37% aqueous solution of formaldehyde.

7. A composition according to claim 1 wherein the phosphoric acid is 85% aqueous phosphoric acid.

8. A composition according to claim 1 wherein the components comprise about 324 parts of a 37% solution of formaldehyde, about 90 parts of urea, about 40 parts of triethanolamine, about 55 parts of melamine, and about 230 parts of 85% phosphoric acid.

9. A wood substrate treated with a composition of claim 1, dried and cured.

10. A paper or cardboard substrate treated with a composition of claim 1, dried and cured.

11. Textiles coated or impregnated with a composition of claim 1, dried and cured.

12. Fabrics coated or impregnated with a composition of claim 1, dried and cured.

13. A method for imparting fire-retardant characteristics to cellulosic and synthetic resin materials which comprises treating the materials with a composition according to claim 1, drying and curing.

* * * * *